Sheet 2-2 Sheets.
H. Isham,
Rotary Meter,
N° 34,147. Patented Jan. 14, 1862.
Fig. 3. B, b.
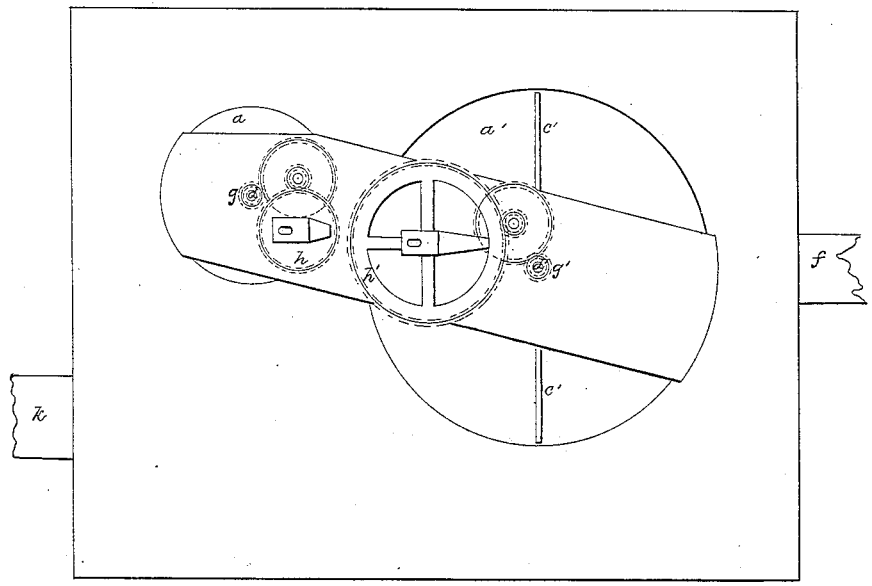
Fig. 4. C, c.
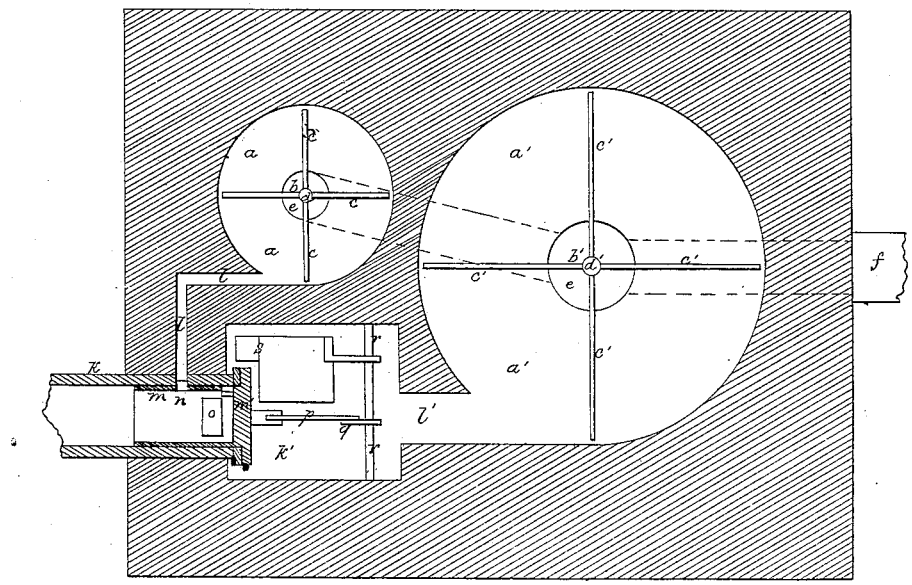
Witnesses:
Wm B Bishop
Geo. D. Sargeant.
Inventor:
Henry Isham.

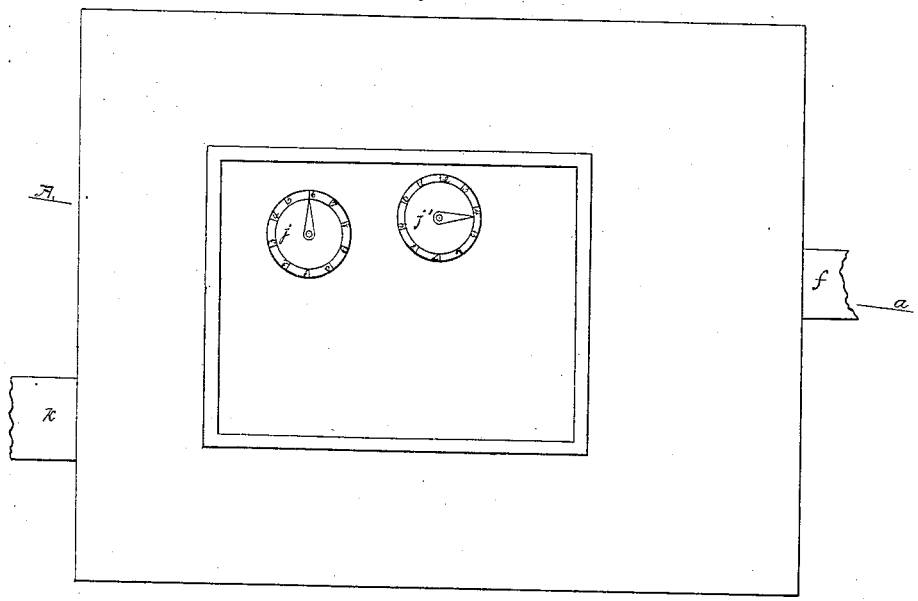
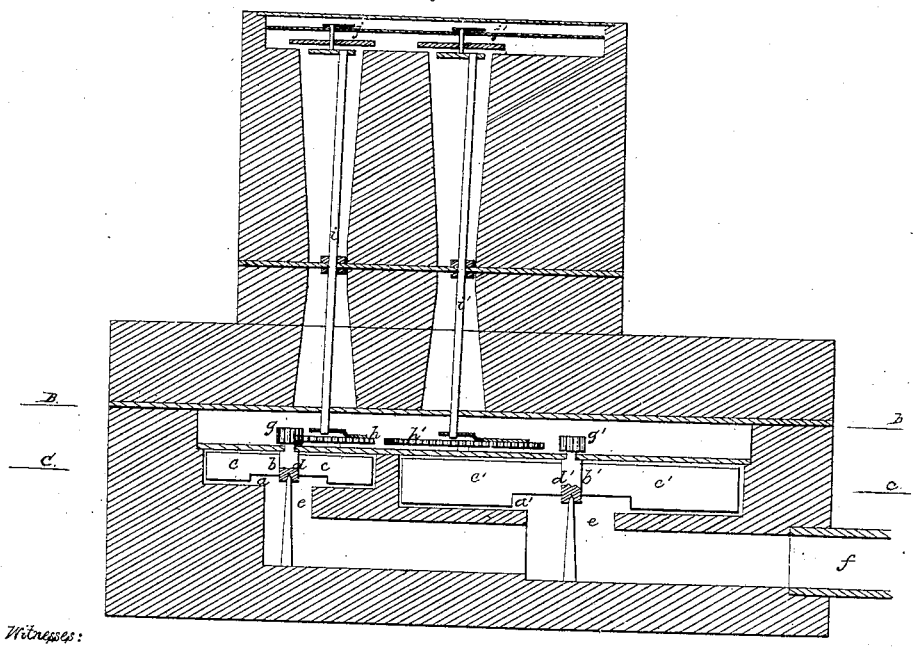

UNITED STATES PATENT OFFICE.

HENRY ISHAM, OF NEW BRITAIN, CONNECTICUT.

IMPROVEMENT IN WATER-METERS.

Specification forming part of Letters Patent No. 34,147, dated January 14, 1862.

*To all whom it may concern:*

Be it known that I, HENRY ISHAM, of New Britain, in the State of Connecticut, have invented a certain new and useful Improvement in Water-Meters; and I do hereby declare that the following is a full, clear, and exact description thereof, reference being had to the accompanying drawings, making part of this specification, in which—

Figure 1 is a plan of a meter on my improved plan; Fig. 2, a vertical section taken at the line A $a$ of Fig. 1, and Figs. 3 and 4 horizontal sections taken at the lines B $b$ and C $c$ of Fig. 2.

The same letters indicate like parts in all the figures.

Water-meters as heretofore constructed have failed to register accurately the quantity of water discharged, particularly in places where the size of the discharge or delivery aperture varies considerably. The percentage of unregistered water which passes through when the discharge-aperture is one inch in diameter will be very much less than when it is only half an inch in diameter, and for the reason that, however sensitive the meter may be—that is to say, however small the amount of power required to operate the meter may be—that amount of power bears a greater proportion to a discharge of half an inch in diameter than it does to one of an inch in diameter. As an illustration, suppose that to operate the mechanism of a meter it requires a power equal to the discharge of a quarter of an inch in diameter. In such a case a constant discharge of a stream a little less than a quarter of an inch in diameter will not be registered at all. In discharging a stream of double that capacity but one half of the quantity of water discharged will be registered, while in discharging a stream of eight times that capacity seven-eighths of the quantity discharged will be registered, and so in proportion.

The object of my invention is to avoid as near as may be the defect above pointed out; and to this end my invention consists in combining two or more meters by a compound valve operated by the force of the current of water, so that the water to be discharged shall be directed to and made to pass through that meter which bears the nearest relation in capacity to the size of the stream of water discharged.

In the accompanying drawings, $a$ $a'$ represent two horizontal circular chambers or curbs, the one $a$ being of much less diameter than the other, $a'$. In each of the two chambers is placed a wheel, $b$ $b'$, composed simply of four (more or less) radial vanes or wings, $c$ $c'$, on a vertical shaft, $d$ $d'$, which turns on a step or pivot at bottom and in a suitable box at the upper end, and so mounted as to turn with the least possible friction. The vanes are of such size as just to clear the bottom and periphery of the chambers or curbs. The chambers or curbs around the shafts extend down some distance below the bottoms, as at $e$ $e$, to form what I denominate the "whirlpools" of the water-ways, which thence continue in horizontal directions each to the discharge-pipe $f$. Each shaft carries at its upper end a pinion, $g$ $g'$, which imparts motion to a train of wheels, the last of which, $h$ $h'$, is provided with a socket at some distance from its center, to receive freely the lower end of a rod, $i$ $i'$, which rod at or about the middle of its length passes through and is attached to a flexible diaphragm made of india-rubber or other flexible waterproof material. By this arrangement the lower end of this rod describes a circle at each revolution of the wheel $h$ $h'$, and it is attached at the middle of its length to the diaphragm, which is flexible. Its upper end also describes a circle to impart motion to the registering apparatus $j$ $j'$ above, by which the number of revolutions made by the wheel is registered. The diaphragm prevents the escape of water from the meter, and by its flexibility permits the rod to vibrate without friction.

The two sets of meters so far described are alike in all respects except as to size, and I make no claim to them separately in this application, as they are described and claimed in an application for Letters Patent heretofore filed by me and now pending in the Patent Office.

There is at $k$ a hollow cylinder, the outer end of which is to be connected with the water-main for the supply of water. The inner end of this cylinder opens into a water-chamber, $k'$, which in turn communicates with the largest chamber or curb, $a'$, by a water-way, $l'$, in a line tangential to the circumference of the curb, and the small curb *a* in like manner communicates by a tangential water-way, *l*, with the inside of the cylinder *k* through an aperture of the required size.

To the inside of the cylinder *k* is fitted another hollow cylinder, *m*, so fitted as to slide therein freely but accurately, and this cylinder *m* is closed at one end, *m'*, and its open end is inserted in the cylinder *k*, the closed end working freely in the water-chamber *k'*. This inner cylinder, which I denominate the "double slide-valve," is formed with two apertures or ports, *n* and *o*, the one *n* corresponding in area with the cross-section of the tangent water-way *l*, leading to the small curb *a*, and the other aperture, *o*, corresponding in area with the tangent water-way *l'*, leading to the large curb *a'*, and the positions of these two ports are such relatively to the aperture in the cylinder *l* and its inner end that when the double slide-valve *m* is forced to its utmost in the cylinder *k*, as represented in the drawings, the port *n* shall be opposite to the tangent water-way *l*, leading to the small curb *a*, and when moved out—that is, into the water-chamber *k'*—to such an extent as to close the water-way *l* the other port, *o*, shall be open or beyond the open end of the cylinder *k* to an extent equal to the capacity of the port *n*. The inner closed end of the double slide-valve cylinder is connected by a joint-link, *p*, with one arm, *q*, of a rock-shaft, *r*, mounted in suitable bearings in the water-chamber *k'*, and the said rock shaft is provided with a weighted arm, *s*, so arranged, as represented, that its weight tends constantly to force the double-valve cylinder into the cylinder *k*, and hence in the position which leaves the port *n* open. In that position when water is drawn from the discharge-pipe *f*, by opening the cock the water under the pressure of the head will pass from the cylinder *k* through the port *n* and tangent water-way *l* into the curb *a*, and acting on the vanes of the wheel *b* will cause it to turn, and will continue to travel around in the said curb, carrying with it the wheel, until it reaches the central whirlpool, *e*, into which it will fall and thence flow to and out at the discharge-pipe, the number of revolutions of the wheel *b* being registered, as in the case of any other meter; and this will continue so long as the discharge-aperture is made no larger than to discharge a stream of water equal to the area of the port *n*, for the force of the weighted arm *s* is so proportioned that the stream of water of that capacity will not be sufficient to overcome this force; but so soon as the discharge-aperture is increased beyond this the force of the current of water through the meter due to the pressure of the descending column acting against the inner closed end of the double-valve cylinder *m* is sufficient to overcome the force of the weighted arm *s*, and it is moved inward, which closes the port *n*, cutting off the water from the small wheel *b*, and opening the large port *o*, directing the water to the large wheel or meter, which then registers for the larger discharge. The moment the discharge-aperture is again reduced down to the capacity of the small meter the reversed action takes place and the water is shut off from the large and admitted to the small meter. The weight which tends to force in the double-valve cylinder must be of course proportioned to the head of water, the area of the closed end of the valve-cylinder, and the relative capacity of the meters, as it is the inward force of the current which tends to open the large port and the opposing force of the weight which tends to close it and keep the small port open.

For localities where the capacity of the discharge varies very much the number of meters may be increased; but for dwellings in which the discharge is seldom less than one cock, or rarely more than two at a time, two meters thus combined will register the quantity of water discharged with a degree of accuracy far surpassing anything heretofore attained; and although I have described that kind of water-meter which I deem the best for reasons not necessary to state, I do not wish it to be understood as limiting my claim of invention to the use of such meters, as other meters to be operated by the force of the passing water may be substituted in applying my said invention. Nor do I wish to be understood as limiting my claim to the combining of two or more meters of different capacities, although I prefer to do so, as that, in my judgment, will produce the best result; but it will be obvious that my said invention may be applied by combining two or more meters of equal capacities, in which case the compound valve must be so modified that when the discharge is increased beyond the capacity of the first meter, instead of stopping that and starting the second, it should simply start the second without stopping the first, and so on to any number.

What I claim as my invention, and desire to secure by Letters Patent, is—

Combining two or more water-meters, substantially as herein described, by means of a compound valve or the equivalent thereof, substantially as described, and operated by the force of the passing water, as set forth.

HENRY ISHAM.

Witnesses:
WM. H. BISHOP,
H. A. HARVEY.